US010887876B2

(12) United States Patent
Lee et al.

(10) Patent No.: US 10,887,876 B2
(45) Date of Patent: Jan. 5, 2021

(54) METHOD AND APPARATUS FOR PERFORMING SEMI PERSISTENT SCHEDULING REACTIVATION BETWEEN SIDELINK AND UPLINK IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 16/070,085

(22) PCT Filed: Feb. 3, 2017

(86) PCT No.: PCT/KR2017/001199
§ 371 (c)(1),
(2) Date: Jul. 13, 2018

(87) PCT Pub. No.: WO2017/135738
PCT Pub. Date: Aug. 10, 2017

(65) Prior Publication Data
US 2018/0359735 A1 Dec. 13, 2018

Related U.S. Application Data

(60) Provisional application No. 62/290,938, filed on Feb. 3, 2016.

(51) Int. Cl.
*H04W 52/00* (2009.01)
*H04W 72/04* (2009.01)

(52) U.S. Cl.
CPC ....... *H04W 72/042* (2013.01); *H04W 72/044* (2013.01); *H04W 72/0406* (2013.01); *H04W 72/0446* (2013.01)

(58) Field of Classification Search
CPC .......... H04W 72/042; H04W 72/0406; H04W 72/044; H04W 72/0446
(Continued)

(56) References Cited

U.S. PATENT DOCUMENTS 8,379,585 B2* 2/2013 Lee ................. H04W 48/12
370/329
8,706,129 B2 4/2014 Wu
(Continued)

OTHER PUBLICATIONS

LG Electronics, "Details on SR, SRS, and SPS transmission for MTC UE", R1-156848, 3GPP TSG RAN WG1 Meeting #83, Anaheim, USA, Nov. 15-22, 2015, See sections 3, 4.
(Continued)

*Primary Examiner* — Sai Ming Chan
(74) *Attorney, Agent, or Firm* — Dentons US LLP

(57) ABSTRACT

While a user equipment (UE) performs a periodic transmission on a first link or a first carrier by using a semi-persistent scheduling (SPS) resource for the first link or the first carrier to an eNodeB (eNB), the UE may receive a SPS resource for a second link or a second carrier from the eNB. Or, a certain event may occur. Then, the UE stops using the SPS resource for the first link or the first carrier, and performs a periodic transmission on the second link or the second carrier by using the SPS resource for the second link or the second carrier to the eNB.

2 Claims, 10 Drawing Sheets

(58) Field of Classification Search
USPC .......................................................... 370/330
See application file for complete search history.

(56) References Cited

U.S. PATENT DOCUMENTS

| | | | |
|---|---|---|---|
| 2010/0113058 A1* | 5/2010 | Wu | H04W 72/02 |
| | | | 455/452.1 |
| 2010/0238875 A1* | 9/2010 | Sung | H04W 72/1289 |
| | | | 370/329 |
| 2012/0039322 A1* | 2/2012 | Tee | H04W 72/0406 |
| | | | 370/338 |
| 2012/0176996 A1* | 7/2012 | Kim | H04W 72/0413 |
| | | | 370/329 |
| 2014/0023008 A1 | 1/2014 | Ahn et al. | |
| 2018/0077748 A1* | 3/2018 | Kazmi | H04W 76/14 |
| 2019/0029006 A1* | 1/2019 | Wang | H04W 72/042 |

OTHER PUBLICATIONS

Ericsson, "SPS support for MTC", R1-156421, 3GPP TSG RAN WG1 Meeting #83, Anaheim, USA, Nov. 15-22, 2015, See section 2.1.

* cited by examiner

METHOD AND APPARATUS FOR PERFORMING SEMI PERSISTENT SCHEDULING REACTIVATION BETWEEN SIDELINK AND UPLINK IN WIRELESS COMMUNICATION SYSTEM

CROSS-REFERENCE TO RELATED APPLICATIONS

This application is the National Stage filing under 35 U.S.C. 371 of International Application No. PCT/KR2017/001199, filed on Feb. 3, 2017, which claims the benefit of U.S. Provisional Application No. 62/290,938 filed on Feb. 3, 2016, the contents of which are all hereby incorporated by reference herein in their entirety.

BACKGROUND OF THE INVENTION

Field of the Invention

The present invention relates to wireless communications, and more particularly, to a method and apparatus for performing semi-persistent scheduling (SPS) reactivation between sidelink (SL) and uplink (UL) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I), covering LTE-based communication between a vehicle and a roadside unit (RSU)/network. A RSU is a transportation infrastructure entity (e.g. an entity transmitting speed notifications) implemented in an eNodeB (eNB) or a stationary UE.

SUMMARY OF THE INVENTION

The present invention provides a method and apparatus for performing semi-persistent scheduling (SPS) reactivation between sidelink (SL) and uplink (UL) in a wireless communication system.

In an aspect, a method for performing a semi-persistent scheduling (SPS) transmission, by a user equipment (UE), in a wireless communication system is provided. The method includes performing a periodic transmission on a first link by using a SPS resource for the first link to an eNodeB (eNB), receiving a SPS resource for a second link from the eNB, stopping using the SPS resource for the first link, and performing a periodic transmission on the second link by using the SPS resource for the second link to the eNB.

In another aspect, a method for performing a semi-persistent scheduling (SPS) transmission, by a user equipment (UE), in a wireless communication system is provided. The method includes performing a periodic transmission on a first link by using a SPS resource for the first link to an eNodeB (eNB), detecting that a certain event occurs, stopping using the SPS resource for the first link, and performing a periodic transmission on a second link by using the SPS resource for the second link to the eNB.

In another aspect, a method for performing a semi-persistent scheduling (SPS) transmission, by a user equipment (UE), in a wireless communication system is provided. The method includes performing a periodic transmission on a first carrier by using a SPS resource for the first carrier to an eNodeB (eNB), receiving a SPS resource for a second carrier from the eNB, stopping using the SPS resource for the first carrier, and performing a periodic transmission on the second carrier by using the SPS resource for the second carrier to the eNB.

SPS can be reactivated between SL and UL efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
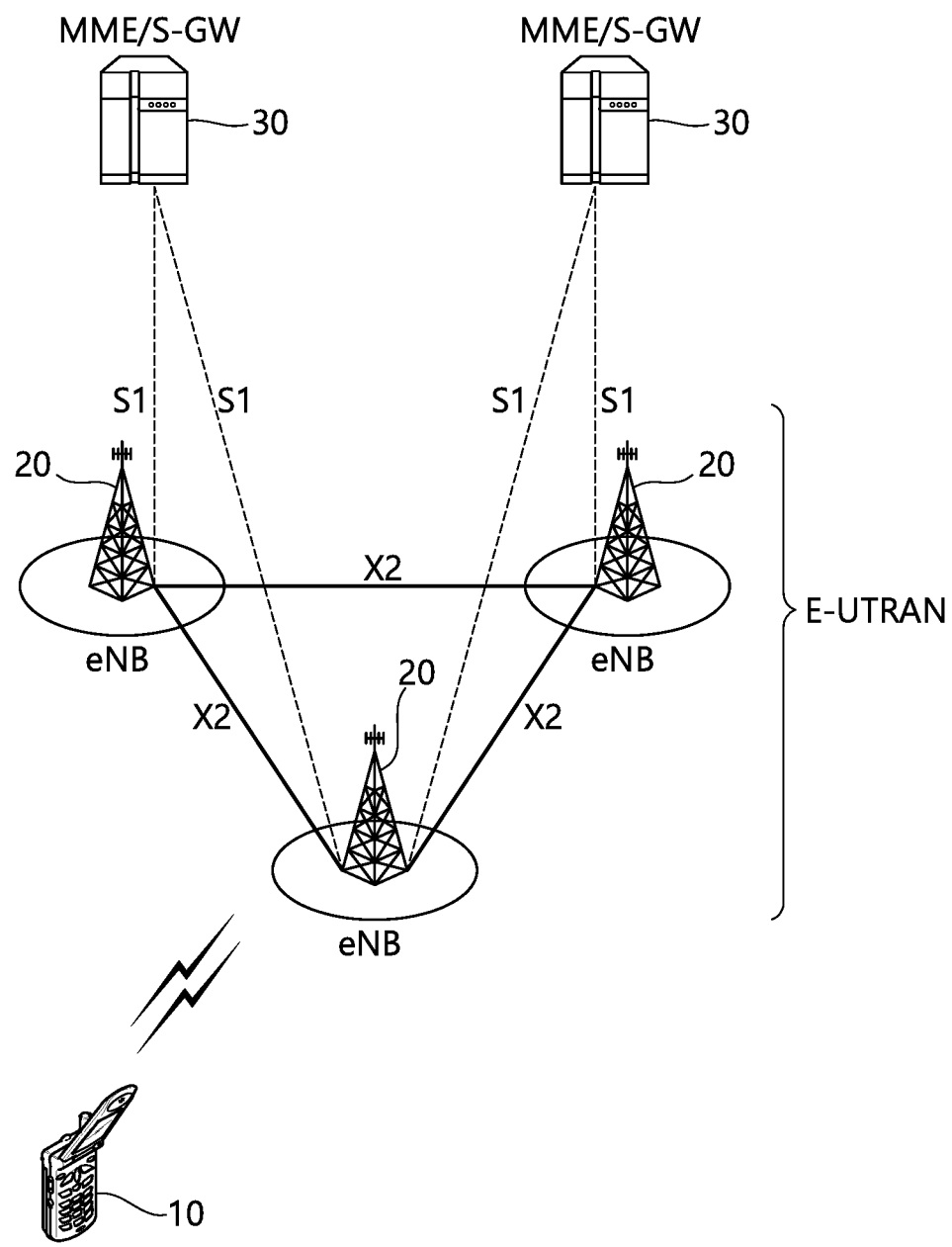
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
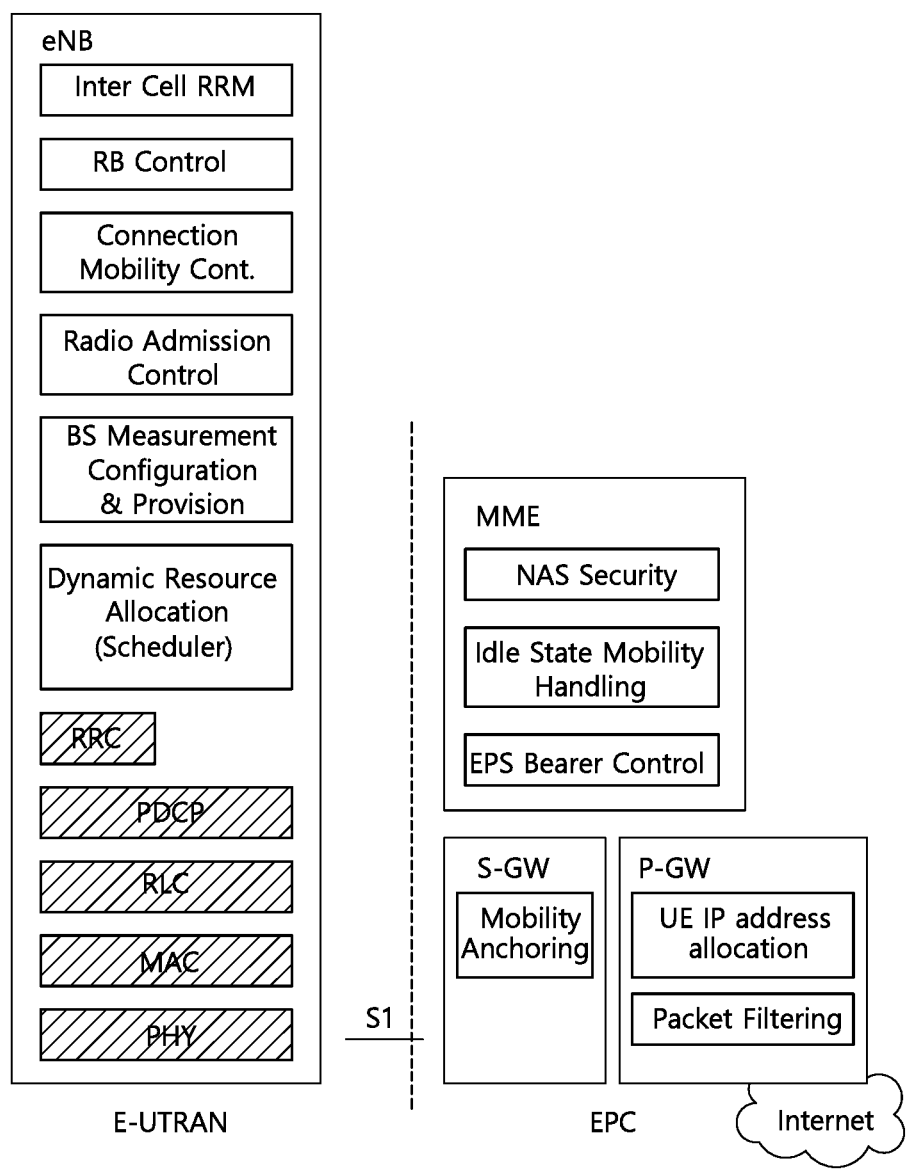
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
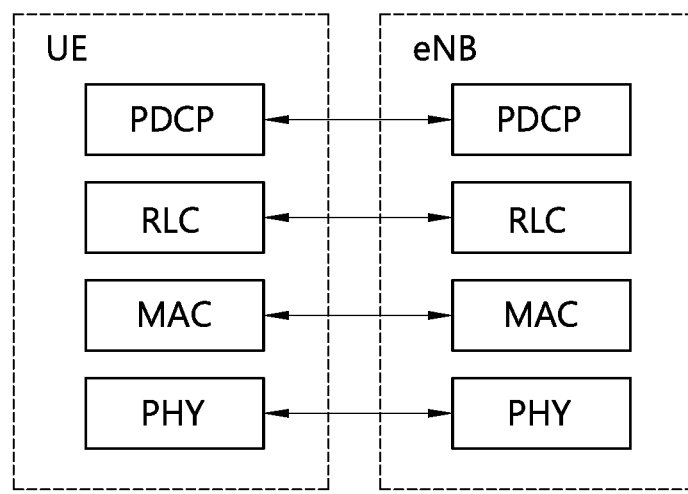
FIG. 3 shows a block diagram of a user plane protocol stack of an LTE system.
Figure 4:
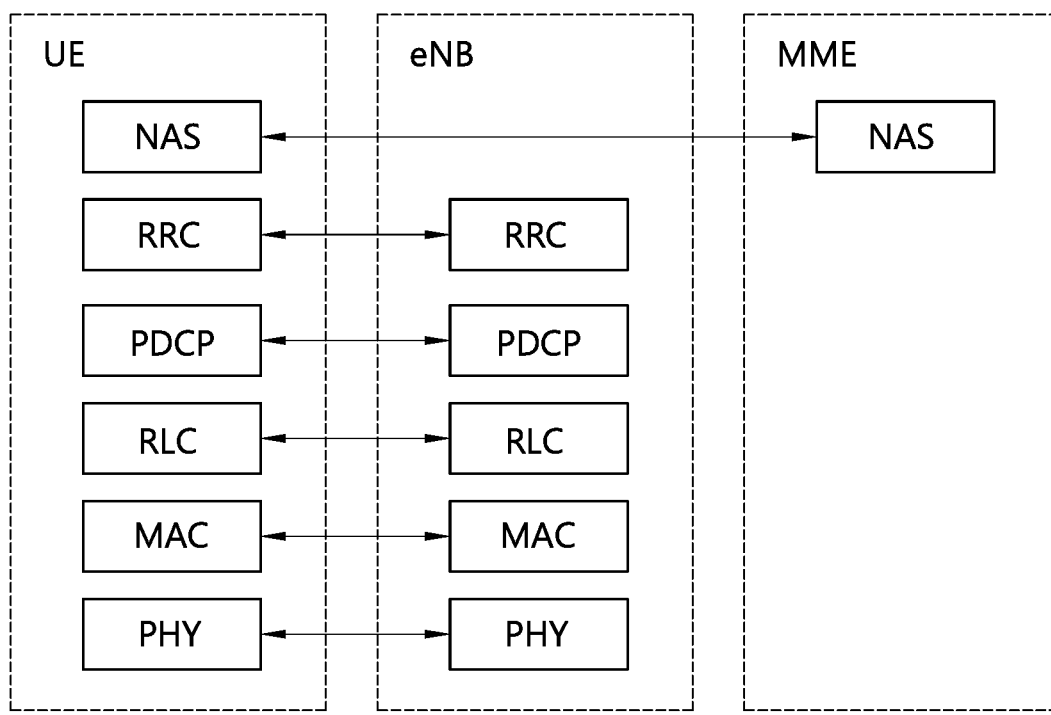
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
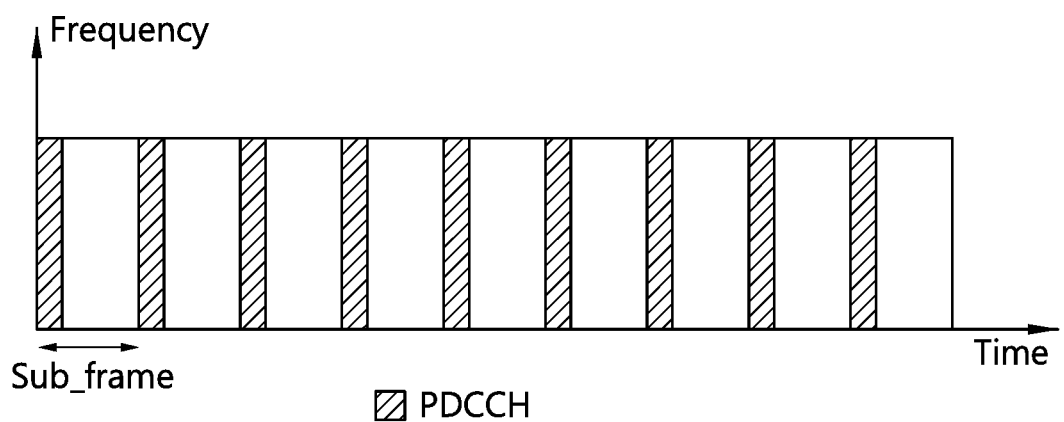
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink (SL) is described. Sidelink is UE to UE interface for ProSe direct communication and ProSe direct discovery. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

For mapping between sidelink transport channels and sidelink physical channels, a sidelink discovery channel (SL-DCH) may be mapped to a physical sidelink discovery channel (PSDCH), which carries ProSe direct discovery message from the UE. The SL-DCH is characterized by:
  fixed size, pre-defined format periodic broadcast transmission;
  support for both UE autonomous resource selection and scheduled resource allocation by eNB;
  collision risk due to support of UE autonomous resource selection; no collision when UE is allocated dedicated resources by the eNB.

Further, a sidelink shared channel (SL-SCH) may be mapped to a physical sidelink shared channel (PSSCH), which carries data from a UE for ProSe direct communication. The SL-SCH is characterized by:
  support for broadcast transmission;
  support for both UE autonomous resource selection and scheduled resource allocation by eNB;
  collision risk due to support of UE autonomous resource selection; no collision when UE is allocated dedicated resources by the eNB;
  support for HARQ combining, but no support for HARQ feedback;
  support for dynamic link adaptation by varying the transmit power, modulation and coding.

Further, a sidelink broadcast channel (SL-BCH) may be mapped to a physical sidelink broadcast channel (PSBCH), which carries system and synchronization related information transmitted from the UE. The SL-BCH is characterized by pre-defined transport format.

A physical sidelink control channel (PSCCH) carries control from a UE for ProSe direct communication. The PSCCH is mapped to the sidelink control resources. The PSCCH indicates resource and other transmission parameters used by a UE for PSSCH.

For mapping between sidelink logical channels and sidelink transport channels for ProSe direct communication, a sidelink broadcast control channel (SBCCH) may be mapped to the SL-BCH. The SBCCH is a sidelink channel for broadcasting sidelink system information from one UE to other UE(s). This channel is used only by ProSe direct communication capable UEs. Further, a sidelink traffic channel (STCH) may be mapped to the SL-SCH. The STCH is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication.

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools and performs transport format selection to transmit sidelink control and data.

ProSe direct discovery is defined as the procedure used by the UE supporting ProSe direct discovery to discover other UE(s) in its proximity, using E-UTRA direct radio signals via PC5. ProSe direct discovery is supported only when the UE is served by E-UTRAN. Upper layer handles authorization for announcement and monitoring of discovery message. Content of discovery message is transparent to AS and no distinction in AS is made for ProSe direct discovery models and types of ProSe direct discovery. The ProSe protocol ensures that only valid discovery messages are delivered to AS for announcement.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via RRC. The eNB assigns resource(s) via RRC. The resources are allocated within the resource pool that is configured in UEs for monitoring.

Semi-persistent scheduling (SPS) is described. E-UTRAN can allocate semi-persistent DL resources for the first HARQ transmissions to UEs. RRC defines the periodicity of the semi-persistent DL grant. PDCCH indicates whether the DL grant is a semi-persistent one, i.e. whether it can be implicitly reused in the following TTIs according to the periodicity defined by RRC.

When required, retransmissions are explicitly signaled via the PDCCH(s). In the subframes where the UE has semi-persistent DL resource, if the UE cannot find its cell radio network temporary identity (C-RNTI) on the PDCCH(s), a DL transmission according to the semi-persistent allocation that the UE has been assigned in the TTI is assumed. Otherwise, in the subframes where the UE has semi-persistent DL resource, if the UE finds its C-RNTI on the PDCCH(s), the PDCCH allocation overrides the semi-persistent allocation for that TTI and the UE does not decode the semi-persistent resources.

When carrier aggregation (CA) is configured, semi-persistent DL resources can only be configured for the primary cell (PCell) and only PDCCH allocations for the PCell can override the semi-persistent allocation. When dual connectivity (DC) is configured, semi-persistent DL resources can only be configured for the PCell or primary secondary cell (PSCell). Only PDCCH allocations for the PCell can override the semi-persistent allocation for PCell and only PDCCH allocations for the PSCell can override the semi-persistent allocation for PSCell.

In addition, E-UTRAN can allocate a semi-persistent UL resource for the first HARQ transmissions and potentially retransmissions to UEs. RRC defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined PRBs according to the pre-defined MCS. Otherwise, in the subframes where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

Similarly as for the DL, semi-persistent UL resources can only be configured for the PCell and only PDCCH allocations for the PCell can override the semi-persistent allocation. When DC is configured, semi-persistent UL resources can only be configured for the PCell or PSCell. Only PDCCH allocations for the PCell can override the semi-persistent allocation for PCell and only PDCCH allocations for the PSCell can override the semi-persistent allocation for PSCell.

When SPS is enabled by RRC, the following information is provided:
 SPS C-RNTI;
 UL SPS interval semiPersistSchedIntervalUL and number of empty transmissions before implicit release implicitReleaseAfter, if SPS is enabled for the UL;
 Whether twoIntervalsConfig is enabled or disabled for UL, only for time division duplex (TDD);
 DL SPS interval semiPersistSchedIntervalDL and number of configured HARQ processes for SPS numberOfConfSPS-Processes, if SPS is enabled for the DL;

When SPS for UL or DL is disabled by RRC, the corresponding configured grant or configured assignment shall be discarded.

The above information may be carried in SPS-Config information element (IE). The IE SPS-Config is used to specify the SPS configuration. Table 1 shows the SPS-Config IE.

TABLE 1

```
-- ASN1START
SPS-Config ::=      SEQUENCE {
    semiPersistSchedC-RNTI      C-RNTI                      OPTIONAL, -- Need OR
    sps-ConfigDL                SPS-ConfigDL                OPTIONAL, -- Need ON
    sps-ConfigUL                SPS-ConfigUL                OPTIONAL -- Need ON
}
SPS-ConfigDL ::= CHOICE{
    release         NULL,
    setup           SEQUENCE {
        semiPersistSchedIntervalDL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        numberOfConfSPS-Processes       INTEGER (1..8),
        n1PUCCH-AN-PersistentList       N1PUCCH-AN-PersistentList,
        ...,
        [[   twoAntennaPortActivated-r10    CHOICE {
                release                         NULL,
                setup                           SEQUENCE {
                    n1PUCCH-AN-PersistentListP1-r10     N1PUCCH-AN-PersistentList
                }
            }                                                               OPTIONAL -- Need ON
        ]]
    }
}
SPS-ConfigUL ::= CHOICE {
    release         NULL,
    setup           SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }                                                                   OPTIONAL, -- Need OP
        twoIntervalsConfig              ENUMERATED {true}                   OPTIONAL, -- Cond TDD
        ...,
```

TABLE 1-continued

```
    [[ p0-PersistentSubframeSet2-r12      CHOICE {
        release                           NULL,
        setup                             SEQUENCE {
            p0-NominalPUSCH-PersistentSubframeSet2-r12    INTEGER (-126..24),
            p0-UE-PUSCH-PersistentSubframeSet2-r12        INTEGER (-8..7)
        }
        }
    ]]
    }
}
N1PUCCH-AN-PersistentList ::=        SEQUENCE (SIZE (1..4)) OF INTEGER (0..2047)
-- ASN1STOP
```

As described above, the SPS-Config IE may include at least one of SPS C-RNTI (semiPersistSchedC-RNTI), UL SPS interval (semiPersistSchedIntervalUL) and number of empty transmissions before implicit release (implicitReleaseAfter), whether twoIntervalsConfig is enabled or disabled for UL (twoIntervalsConfig), and DL SPS interval (semiPersistSchedIntervalDL) and number of configured HARQ processes for SPS (numberOfConfSPS-Processes), if SPS is enabled for the DL.

The SPS-Config IE may be included in RadioResourceConfigDedicated IE. The IE RadioResourceConfigDedicated is used to setup/modify/release RBs, to modify the MAC main configuration, to modify the SPS configuration and to modify dedicated physical configuration. The RadioResourceConfigDedicated IE may be included in one of RRCConnectionReconfiguration message, RRCConnectionReestablishment message, or RRCConnectionSetup message. Table 2 shows The RadioResourceConfigDedicated IE.

TABLE 2

```
-- ASN1START
RadioResourceConfigDedicated ::= SEQUENCE {
    srb-ToAddModList            SRB-ToAddModList              OPTIONAL, -- Cond HO-Conn
    drb-ToAddModList            DRB-ToAddModList              OPTIONAL, -- Cond HO-toEUTRA
    drb-ToReleaseList           DRB-ToReleaseList             OPTIONAL, -- Need ON
    mac-MainConfig              CHOICE {
        explicitValue               MAC-MainConfig,
        defaultValue                NULL                      OPTIONAL, -- Cond HO-toEUTRA2
    sps-Config                  SPS-Config                    OPTIONAL,-- Need ON
    physicalConfigDedicated     PhysicalConfigDedicated       OPTIONAL, -- Need ON
    ...,
    [[ rlf-TimersAndConstants-r9         RLF-TimersAndConstants-r9      OPTIONAL -- Need ON
    ]],
    [[ measSubframePatternPCell-r10      MeasSubframePatternPCell-r10   OPTIONAL -- Need ON
    ]],
    [[ neighCellsCRS-Info-r11            NeighCellsCRS-Info-r11         OPTIONAL -- Need ON
    ]],
    [[ naics-Info-r12                    NAICS-AssistanceInfo-r12       OPTIONAL -- Need ON
    ]]}
RadioResourceConfigDedicatedPSCell-r12 ::= SEQUENCE {
    -- UE specific configuration extensions applicable for an PSCell
    physicalConfigDedicatedPSCell-r12    PhysicalConfigDedicated        OPTIONAL, -- Need ON
    sps-Config-r12                       SPS-Config                     OPTIONAL, -- Need ON
    naics-Info-r12                       NAICS-AssistanceInfo-r12       OPTIONAL, -- Need ON
    ...
}
```

Referring to Table 2, the RadioResourceConfigDedicated IE may include The SPS-Config IE. Except for handover or releasing SPS for master cell group (MCG), E-UTRAN does not reconfigure SPS-Config for MCG when there is a configured DL assignment or a configured UL grant for MCG. Except for SCG change or releasing SPS for SCG, E-UTRAN does not reconfigure SPS-Config for SCG when there is a configured DL assignment or a configured UL grant for SCG.

After a SPS DL assignment is configured, the MAC entity shall consider sequentially that the $N^{th}$ assignment occurs in the subframe for which:

$$(10*SFN+subframe)=[(10*SFN_{start\ time}+subframe_{start\ time})+N*semiPersistSchedIntervalDL]modulo\ 10240,$$

where $SFN_{start\ time}$ and $subframe_{start\ time}$ are the system frame number (SFN) and subframe, respectively, at the time the configured DL assignment were (re-) initialized.

After a SPS UL grant is configured, the MAC entity shall:
1> if twoIntervalsConfig is enabled by upper layer:
2> set the Subframe_Offset according to Table 3 below.

TABLE 3

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | -1 |

TABLE 3-continued

| TDD UL/DL configuration | Position of initial Semi-Persistent grant | Subframe_Offset value (ms) |
|---|---|---|
| 2 | Subframe 2 | 5 |
|   | Subframe 7 | −5 |
| 3 | Subframes 2 and 3 | 1 |
|   | Subframe 4 | −2 |
| 4 | Subframe 2 | 1 |
|   | Subframe 3 | −1 |
| 5 | N/A | 0 |
| 6 | N/A | 0 |

1> else:
2> set Subframe_Offset to 0.
1> consider sequentially that the $N^{th}$ grant occurs in the subframe for which:

2> (10*SFN subframe)=[10*$SFN_{start\ time}$+
subframe$_{start\ time}$)+
$N$*semiPersistSchedIntervalUL+Subframe_Offset*($N$ modulo 2)]modulo 10240, where $SFN_{start\ time}$ and subframe$_{start\ time}$ are the SFN and subframe, respectively, at the time the configured uplink grant were (re-)initialized.

The MAC entity shall clear the configured UL grant immediately after implicitReleaseAfter number of consecutive new MAC PDUs each containing zero MAC SDUs have been provided by the multiplexing and assembly entity, on the SPS resource.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X Service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, a method for reactivating SPS between SL and UL according to the present invention is proposed. According to an embodiment of the present invention, the UE may be configured SPS resources for both SL and UL. When the eNB re-activates SPS, the eNB may switch SPS transmissions between SL and UL for the UE, i.e. from SL to UL or from UL to SL. More specifically, upon receiving SPS (re-) activation command from the eNB, the UE may replace SL SPS resource with UL SPS resource, so that the UE may stop using SL SPS resource and start using UL SPS resource. Or, upon receiving SPS (re-)activation command from the eNB, the UE may replace UL SPS resource with SL SPS resource, so that the UE may stop using UL SPS resource and start using SL SPS resource.

In another embodiment of the present invention, the UE may autonomously switch SPS transmissions between SL and UL, i.e. from SL to UL or from UL to SL. More specifically, the UE may switch from UL SPS resource to SL SPS resource by replacing UL SPS resource with SL SPS resource during handover, radio link failure (RLF) or (re-) establishment. Further, the UE may autonomously revert to UL SPS resource by replacing SL SPS resource with UL SPS resource after completion of handover or (re-)establishment. Or, the UE may switch from SL SPS resource to UL SPS resource by replacing SL SPS resource with USPS resource during handover, RLF or (re-)establishment. Further, the UE may autonomously revert to SL SPS resource by replacing UL SPS resource with SL SPS resource after completion of handover or (re-)establishment.

In another embodiment of the present invention, the UE may be configured with SPS resources for multiple carrier frequencies, regardless of SL and UL. When the eNB re-activates SPS by indicating a cell index corresponding to the first carrier e.g. in PDCCH or MAC control element (CE), the UE may perform SPS transmission on the second carrier by replacing SPS resource on the second carrier with SPS resource on the first carrier. Thus, the UE may stop using SPS resource on the second carrier and starts SPS transmission on the first carrier.

In another embodiment of the present invention, if the UE receives SPS configuration for both SL and UL, when data is available for both SL and UL transmissions, the UE may request SPS activation to the eNB and then perform SPS transmissions on either SL or UL depending on SPS activation command received from the eNB. The UE may transmit the SPS activation request to the eNB on PUCCH, MAC CE, or RRC messages, e.g. during RRC connection (re-) establishment, during handover, after handover complete, or in RRC_CONNECTED.

In embodiments of the present invention described above, SPS specific RNTI (hereinafter, SPS-RNTI) may be used for SPS transmissions in both SL and UL for a UE.

The embodiments of the present invention are described in detail. The UE may be configured with SPS resource and control resource for SL and UL transmissions. The control resource may be used to request SPS activation only for UL SPS resource, only for SL SPS resource, or for both UL and SL SPS resources for one or more specific logical channel(s). The control resource may be one of PUCCH resource, random access resource, new UL control channel resource, or RRC message, such as RRC connection request message, RRC connection re-establishment request message, RRC connection resume request message. The specific logical channels may be either a set of UL logical channel and SL logical channel or a bi-directional logical channel which may be used for both UL and SL transmission.

Upon receiving the SPS activation request from the UE, the eNB may determine either SL or UL for SPS operation. If the eNB transmits SPS activation command for SL SPS resource, the UE performs SPS transmission in SL. Then, if the eNB transmits SPS re-activation command for UL SPS resource, the UE stops using SL SPS resource, releases SL SPS resource, and activates UL SPS resource, transmit data by using UL SPS resource. Alternatively, upon receiving the SPS activation request from the UE, the eNB may determine either SL or UL for SPS operation. If the eNB transmits SPS activation command for UL SPS resource, the UE performs SPS transmission in UL. Then, if the eNB transmits SPS re-activation command for SL SPS resource, the UE stops using UL SPS resource, releases UL SPS resource, and activates SL SPS resource, transmit data by using SL SPS resource. The SPS activation request may be replaced by SPS resource reservation request. Thus, activation of SPS resource configuration may be interpreted as reservation of periodic resource for SL transmission.

Further, a certain event, such as handover, handover failure, RLF, connection re-establishment, or connection establishment may happen to the UE performing SPS transmissions in UL. If the event occurs, the UE may autonomously switch from UL SPS transmission to SL SPS transmission (or vice versa) for a while, and then switch back to UL SPS transmission (or SL SPS transmission) when the event ends, e.g. after successful handover, after successful connection re-establishment and after successful connection establishment.

The present invention may be used only for SL SPS operation, only for UL SPS operation or for both UL SPS and SL SPS operations.

Figure 6:
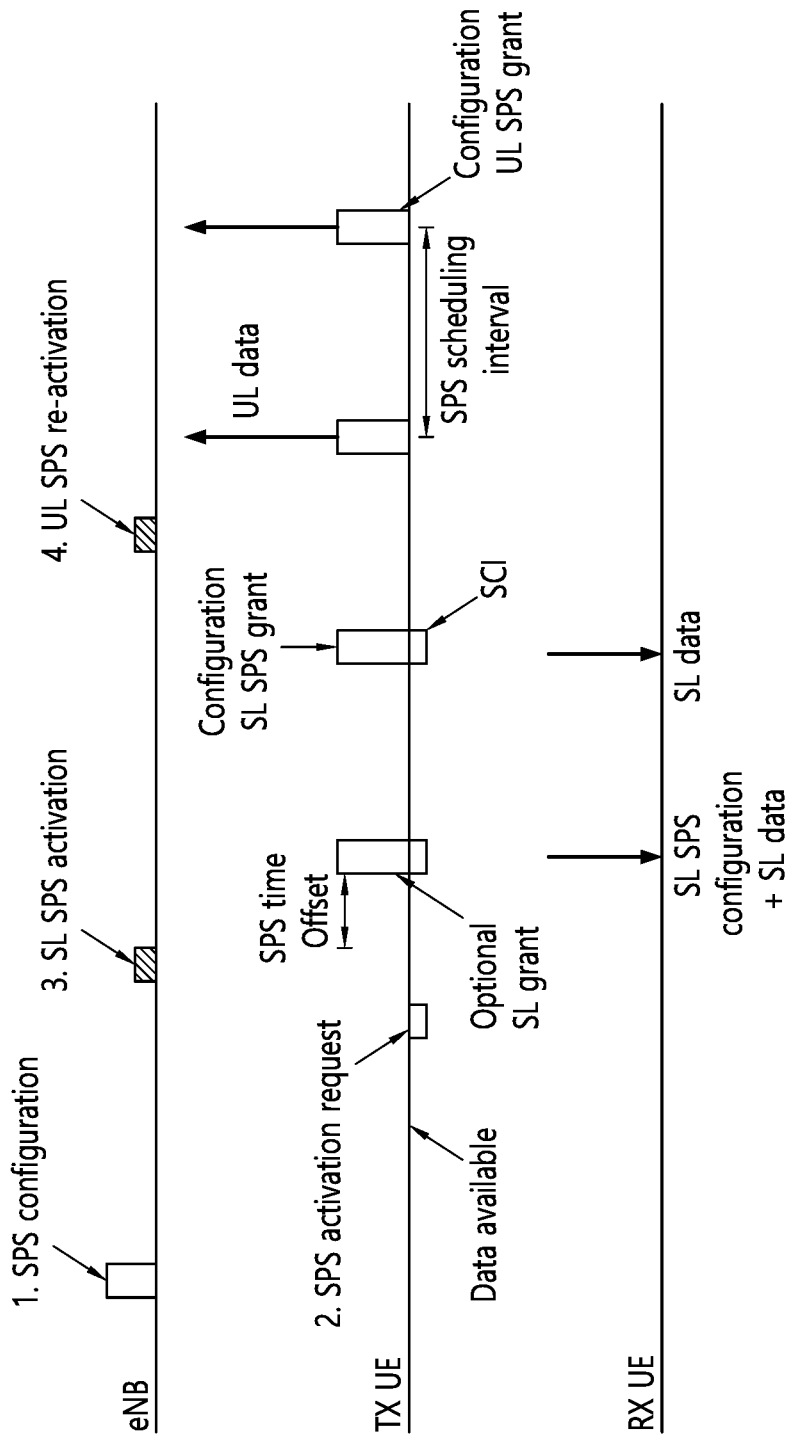
FIG. 6 shows an example of SPS activation for SL and SPS reactivation for UL according to an embodiment of the present invention.

FIG. 6 shows an example of SPS activation for SL and SPS reactivation for UL according to an embodiment of the present invention. FIG. 6 shows how the eNB/UE activates and re-activate SPS resource between SL and UL according to an embodiment of the present invention. In this embodiment, the UE may be in any RRC state, i.e. RRC_CONNECTED, RRC_IDLE or RRC suspended state. In this embodiment, the SPS resource may be exclusively used for V2X communication or V2X related channel. For example, SPS resource may be only used to send V2X messages, so that the SPS resource may be granted only to carry data via one or more specific channel, e.g. a logical channel configured to send V2X messages.

1. Step 1

The eNB provides a SL/UL SPS configuration (SPS-Config) to the UE by RRC signaling. The SPS-Config may include at least one piece of the following information.

Time/Frequency information of the SPS resource for UL
Time/Frequency information of the SPS resource for SL transmission
Interval of the SPS resource, i.e. SPS scheduling interval for both UL and SL transmission
SPS-RNTI (which can be dedicated to one or more specific logical channels, e.g. for V2X communication) for both UL and SL transmission
Validity duration (SPSValidDuration) in which the SPS-Config is valid in a unit of e.g. subframes, radio frames, milliseconds, or seconds,
List of at least one cell (SPSCellList) in which the SPS-Config is valid.
Logical channel identifier(s) which is subject to the SPS-Config, i.e. the specific logical channel(s). In other words, only data from logical channels indicated by the logical channel identifier can be transmitted by using the SPS resource. Data from other logical channels cannot be transmitted by using the SPS resource. The specific logical channels may be either a set of UL logical channel and SL logical channel or a bi-directional logical channel which may be used for both UL and SL transmission.

The RRC signaling may be system information, RRC connection setup message or RRC connection reconfiguration message or RRC connection release message. If the UE is in RRC_IDLE, the UE may receive the SPS-Config via system information. Alternatively, if the UE is in RRC_CONNECTED, the UE may receive the SPS-Config via RRC connection setup message, RRC connection reconfiguration message, or RRC connection release message. The UE may keep the SPS-Config when the UE moves to RRC_IDLE. So, the SPS-Config may be stored in the UE in RRC_IDLE.

Upon receiving the SPS-Config by RRC signaling, the UE may (re-)configure the SPS resource including frequency information of the SPS resource, PUCCH for SPS scheduling information, SPS-RNTI, SPS scheduling interval and SPSCellList. But, the UE may not determine time information of the SPS resource including SPS time offset, until SPS is activated.

2. Step 2

When data becomes available for specific logical channel(s), the UE triggers a scheduling request (SR) in order to activate SPS. The SR may be specific to the specific logical channel(s), specific to V2X communication, or specific to this SPS operation.

The UE may transmit the SR via PUCCH. The SR may be used to request SPS activation to the eNB. The SR on PUCCH may also be used to inform the eNB about the amount of SL data available for transmission over the specific logical channel(s). Subsequently, the UE may transmit UL-SCH including (sidelink) buffer status report (BSR) MAC CE which can be specific to the specific logical channel(s), a specific logical channel group, specific to the V2X communication, or specific to this SPS operation. The UE may also indicate SPS timing to the eNB together with the BSR MAC CE.

Alternatively, the UE may transmit the SR via random access. In this case, random access preamble (i.e. Msg 1 in random access) or scheduled transmission on UL-SCH (i.e. Msg 3 in random access) may be used to request SPS activation to the eNB. The Msg 1 or Msg 3 may also inform the eNB about the amount of SL data available for transmission over the specific logical channel(s). The Msg 3 may include MAC CE such as BSR MAC CE to inform the eNB about the amount of SL data available for transmission over the specific logical channel(s). The MAC CE may be used to activate SPS. The MAC CE may be specific to the specific logical channel(s), a specific logical channel group, specific to the V2X communication, or specific to this SPS operation. The UE may also indicate SPS timing to the eNB together with the MAC CE.

The SPS timing is used to indicate to the eNB when SPS should be activated. The SPS timing may directly indicate SFN number and subframe number, both of which correspond to when SPS should be activated. Alternatively, the SPS timing may indicate delayed time before transmitting the SPS timing. For example, the delayed time before transmitting the SPS timing may be time interval between SR triggering timing and MAC CE transmission timing.

Operation of step 2 will be described in detail per RRC state. The operation of step 2 may be applied to any RRC state.

(1) When the UE is in RRC_IDLE

When UL data becomes available for specific logical channel(s), specific PDN, or specific service/application (e.g. V2X communication), and when the SPS-Config is available for the serving cell (since the UE receives SPS-Config via system information or RRC connection release message), the UE triggers connection establishment and transmits a message to the eNB in order to activate the SPS resource. The message may include at least one of the followings. The message may correspond to RRC connection request message, RRC connection resume request message or RRC connection reestablishment request message.

UE ID, such as system architecture evolution (SAE) temporary mobile subscriber identity (S-TMSI) or C-RNTI; or Cell ID, such as physical cell ID, corresponding to a cell which allocates the C-RNTI; or SPS activation request and/or V2X indication e.g. in establishment cause; or Resume ID (if the UE suspends data RBs (DRBs))

SPS timing (2) When the UE is in RRC_CONNECTED: The UE in RRC_CONNECTED may receive a handover command (e.g. RRC connection reconfiguration message with mobility control information) or the UE may select another cell without a handover command regardless of RRC state.

When data becomes available for specific logical channel(s), specific PDN, or specific service/application (e.g. V2X communication), and when the SPS-Config is available for the serving cell (since the UE receives SPS-Config via system information or handover command), if the UE is not in the target cell, the UE performs SPS transmission. For example, before the UE is synchronized to DL of the target cell or before the UE performs random access towards the target cell, the UE may perform UL transmission by using the SPS resource towards the source cell.

When data becomes available for specific logical channel(s), specific PDN, or specific service/application (e.g. V2X communication), and when the SPS-Config is available for the serving cell (since the UE receives SPS-Config via system information or handover command), if the UE is in the target cell, the UE transmits a handover complete message to the target cell in order to activate the SPS resource. For example, after the UE is synchronized to the target cell or after the UE performs random access towards the target cell, the UE may transmit a handover complete message to the target cell in order to activate the SPS resource. The target cell may transmit a handover command to the source cell. The handover command may include UE's C-RNTI and UE's SPS-RNTI which of both are used at the target cell. The handover complete message may include at least one of the followings. The handover complete message may correspond to RRC connection reconfiguration complete message, RRC connection request message, RRC connection resume request message or RRC connection reestablishment request message.

UE ID, such as C-RNTI (allocated either by the source cell or target cell), e.g. in C-RNTI MAC CE; or Cell ID, such as physical cell ID, corresponding to a cell which allocates the C-RNTI; or SPS activation request and/or V2X indication e.g. in establishment cause; or Resume ID (if the UE suspends DRBs)

SPS timing

Meanwhile, the above operation of step 2 may be performed when the UE wants to request SPS reactivation, e.g. when SPS timing needs to be adjusted. Thus, the UE may also transmit the SPS activation request for SPS reactivation. Upon receiving the SPS activation command (i.e. SPS re-activation command), the UE may replace old SPS resources with new SPS resources. For example, time offset may be replaced by the SPS re-activation command.

3. Step 3

Upon receiving the SPS activation request from the UE, the eNB transmits a SPS activation command to the UE to activate SPS. The SPS activation request may be received via a scheduling request on PUCCH or RRC messages, such as RRC connection request message, RRC connection resume request message, RRC connection reconfiguration complete message, RRC connection reestablishment request message, or handover complete message, etc. The SPS activation command may correspond to PDCCH addressing UE's C-RNTI or SPS-RNTI, MAC CE, or RRC messages, such as RRC connection setup message, RRC connection reestablishment message, etc. The SPS activation command may also indicate when SPS is activated for the UE. For example, the SPS activation command may indicate SPS time offset, which corresponds time interval between transmission of the SPS activation command and the first SPS transmission.

The SPS activation command on PDCCH addressed by SPS-RNTI may grant SL resource or UL resource to the UE. The SL or UL resources may be allocated before the first SPS transmission occurs, and the SL or UL resources may be independent from the SPS resource. The SL OR UL resource may be used for data available for transmission over the specific logical channel(s). The SL or UL resource may correspond to a single transmission including subsequent HARQ re-transmissions.

Upon receiving the SPS activation command from the eNB, the UE (configures and) activates SPS transmissions by using the SPS-Config. If the SPS activation command explicitly indicates when SPS is activated, i.e. SPS time offset, the UE may activate SPS transmission according to the explicit SPS time offset. Otherwise, the SPS time offset may be determined as Nth subframe from the subframe where the SPS activation command is received. The N value may be signaled by RRC message or pre-fixed.

The UE may continue to perform SPS transmission in SL or UL by using the SPS resource configured by the SPS-Config. If the eNB activates SL SPS, the UE may transmit sidelink control information (SCI) and SL transmission according to the SL SPS resource. If the eNB actives UL SPS, the UE may transmit UL transmission according to the UL SPS resource. The UE may use the SPS resource configured by the SPS-Config only if the UE considers the SPS-Config as valid. In order to determine whether the SPS-Config is valid or not, the UE may use SPSValidDuration and/or SPSCellList included in the SPS-Config.

The specific logical channel may correspond to DRB or signaling radio bearer (SRB). The UE may suspend the DRB for the specific logical channel and then resume the DRB when SPS is activated, i.e. when the SPS activation command is received.

Further, the UE may transmit a whole or part of the SPS-Config to one or more receiving UE(s). The SPS-Config may be carried via an RRC message or MAC CE. The receiving UE(s) may use the SPS-Config to perform SL reception. For example, the receiving UE may perform discontinuous reception according to SPS scheduling interval included in the SPS-Config.

The UE may request SPS release (or deactivation) by using one of SR (on PUCCH or random access), L1 UL control information, MAC CE or RRC messages. Upon receiving the SPS release request (or deactivation request), the eNB may transmit a SPS release command (or deactivation command) to the UE. The SPS release command (or deactivation command) may correspond to PDCCH addressing UE's C-RNTI or SPS-RNTI, MAC CE, or RRC messages, such as RRC connection setup message, RRC connection reestablishment message. Upon receiving the SPS release command (or deactivation command), the UE may release the configured SPS resource and stop using the configured SPS resource.

The SPS release command may indicate either UL SPS release command or SL SPS release command. The UE may release only UL SPS resource for UL SPS release command, while the UE may release only SL SPS resource for SL SPS release command. If the SPS release command indicates both SL and UL SPS release command, the UE may release both UL and SL SPS resources.

4. Step 4

The UE receives UL SPS reactivation command from the UE. That is, the eNB may switch SPS transmissions from SL to UL. Upon receiving the UL SPS reactivation command, the UE may replace SL SPS resource with UL SPS resource, so that the UE may stop using SL SPS resource and start using UL SPS resource. That is, the UE may stop using SL SPS resource, releases SL SPS resource, and activates UL SPS resource, transmit UL data by using UL SPS resource.

Meanwhile, the SPS resource and control resource may be allocated for multiple carrier frequencies only for UL SPS resource, only for SL SPS resource, or for both UL and SL SPS resources for one or more specific logical channel(s) for a UE. When the eNB commands SPS activation to the UE, the eNB may indicate which carrier frequency or which cell on the carrier frequency SPS is activated on.

For example, SL SPS resource may be allocated on frequency 1 and 2, while UL SPS resource may be allocated on frequency 2 and 3. If the eNB commands SPS activation to the UE for a cell on frequency 1, the UE starts SL transmissions by using SL SPS resource on the cell on frequency 1. The eNB may address the cell on frequency 1 by indicating a cell index or frequency on the SPS activation command. Then, if the eNB commands SPS reactivation to the UE for a cell on frequency 2 for SL, the UE stops using SPS resource on the cell on frequency 1, and then starts SL transmissions by using SL SPS resource on the cell on frequency 2. The eNB may address a cell on frequency 2 by indicating a cell index or frequency together with indication to SL on the SPS activation command. Then, if the eNB commands SPS reactivation to the UE with other cell on frequency 2 for UL, the UE stops using SL SPS resource on the cell on frequency 2, and then starts UL transmissions by using UL SPS resource on the cell on frequency 2. The eNB may address the cell on frequency 2 by indicating a cell index or frequency together with indication to UL on the SPS activation command. Then, if the eNB commands SPS reactivation to the UE with other cell on frequency 3, the UE stops using UL SPS resource on the cell on frequency 2, and then starts UL transmissions by using UL SPS resource on the cell on frequency 3. The eNB may address the cell on frequency 3 by indicating a cell index or frequency on the SPS activation command.

Figure 7:
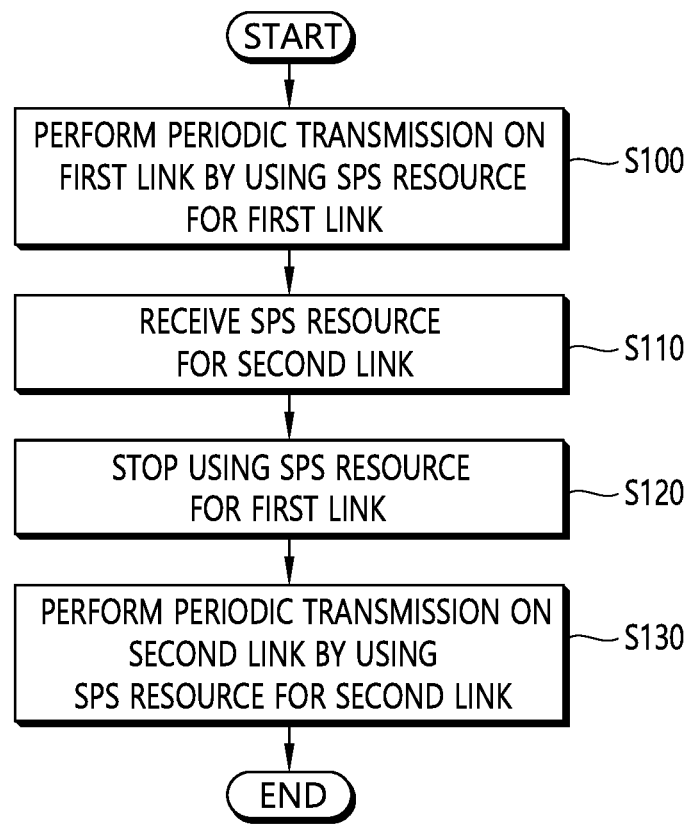
FIG. 7 shows a method for performing a SPS transmission by a UE according to an embodiment of the present invention.

FIG. 7 shows a method for performing a SPS transmission by a UE according to an embodiment of the present invention.

In step S100, the UE performs a periodic transmission on a first link by using a SPS resource for the first link to the eNB. The UE may further receive a SPS activation command for the periodic transmission on the first link from the eNB.

In step S110, the UE receives a SPS resource for a second link from the eNB. The UE may further receive a SPS reactivation command for the periodic transmission on the second link from the eNB. The first link may be a SL, and the second link may a UL. Or, the first link may be a UL, and the second link may be a SL.

In step S120, the UE stops using the SPS resource for the first link. In step S130, the UE performs a periodic transmission on the second link by using the SPS resource for the second link to the eNB.

Figure 8:
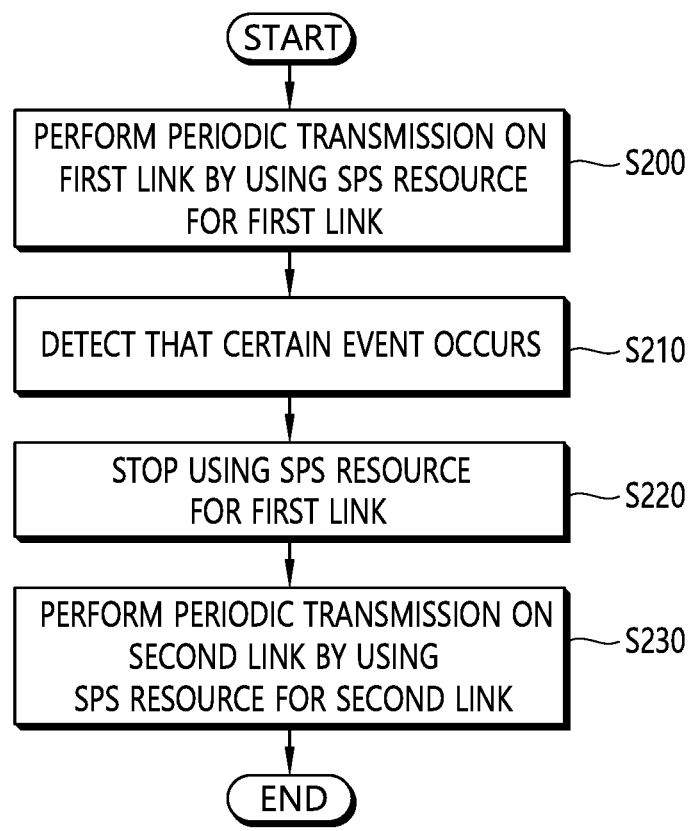
FIG. 8 shows a method for performing a SPS transmission by a UE according to another embodiment of the present invention.

FIG. 8 shows a method for performing a SPS transmission by a UE according to another embodiment of the present invention.

In step S200, the UE performs a periodic transmission on a first link by using a SPS resource for the first link to the eNB.

In step S210, the UE detects that a certain events occurs. The certain event may include at least one of handover, handover failure, RLF, connection establishment or connection reestablishment.

In step S220, the UE stops using the SPS resource for the first link. In step S230, the UE performs a periodic transmission on a second link by using the SPS resource for the second link to the eNB. The first link may be a SL, and the second link may a UL. Or, the first link may be a UL, and the second link may be a SL. Further, after the certain events ends, the UE may perform a periodic transmission on the first link by using the SPS resource for the first link to the eNB.

Figure 9:
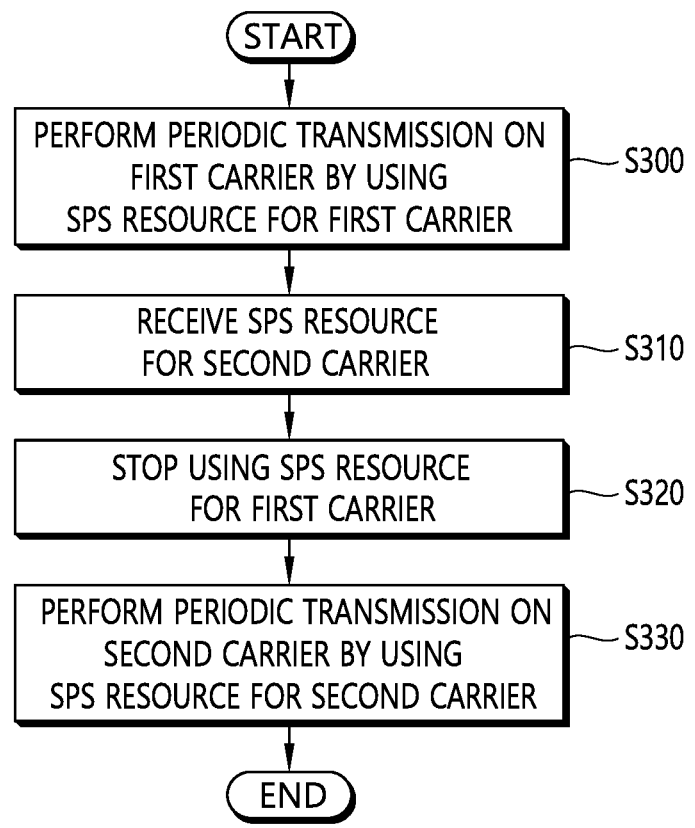
FIG. 9 shows a method for performing a SPS transmission by a UE according to another embodiment of the present invention.

FIG. 9 shows a method for performing a SPS transmission by a UE according to another embodiment of the present invention.

In step S300, the UE performs a periodic transmission on a first carrier by using a SPS resource for the first carrier to the eNB.

In step S310, the UE receives a SPS resource for a second carrier from the eNB. The UE may further receive a SPS reactivation command for the periodic transmission on the second carrier from the eNB. The SPS reactivation command may include a cell index corresponding to the second carrier or a carrier frequency corresponding to the second carrier.

In step S120, the UE stops using the SPS resource for the first carrier. In step S130, the UE performs a periodic transmission on the second carrier by using the SPS resource for the second carrier to the eNB.

The SPS resource for the first carrier and the SPS resource for the second carrier may include at least one of sidelink (SL) SPS resource or uplink (UL) SPS resource.

Figure 10:
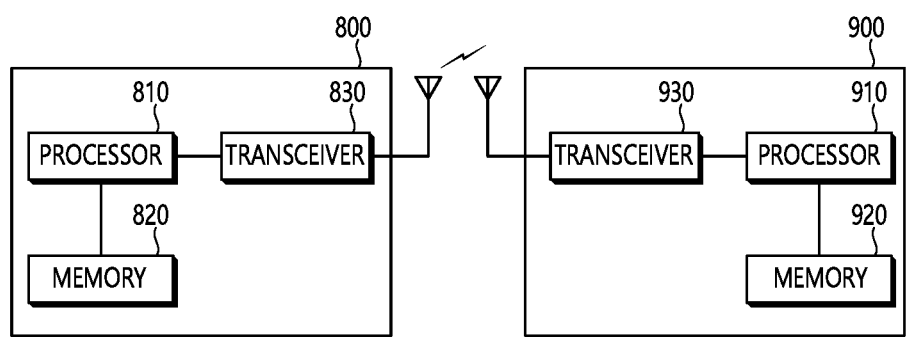
FIG. 10 shows a wireless communication system to implement an embodiment of the present invention.

FIG. 10 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for a user equipment (UE) in a wireless communication system, the method comprising:
   receiving, from a base station (BS), a first semi-persistent scheduling (SPS) configuration related to a SPS resource for both a sidelink (SL) and an uplink (UL);
   configuring the SPS resource based on the SPS configuration;
   receiving, from the BS, a SL SPS activation command for a periodic transmission on the SL;
   performing the periodic transmission on the SL using the SPS resource upon receiving the SL SPS activation command;
   receiving, from the BS, a UL SPS activation command for a periodic transmission on the UL;
   stopping the periodic transmission on the SL using the SPS resource upon receiving the UL SPS activation command; and
   performing the periodic transmission on the UL using the SPS resource
   upon receiving the UL SPS activation command.

2. A method for a user equipment (UE) in a wireless communication system, the method comprising:
   receiving, from a base station (BS), a semi-persistent scheduling (SPS) configuration related to a SPS resource for both an uplink (UL) and a sidelink (SL);
   configuring the SPS resource based on the SPS configuration;
   performing a periodic transmission on the UL using the SPS resource to the BS;
   detecting that a certain event occurs,
   wherein the certain event includes at least one of handover, handover failure, radio link failure (RLF), connection establishment, or connection reestablishment;
   stopping the periodic transmission on the UL using the SPS resource upon a detection that the certain event occurs;
   performing a periodic transmission on the SL using the SPS resource to the BS upon the detection that the certain event occurs;
   detecting that the certain event ends;
   stopping the periodic transmission on the SL using the SPS resource upon a detection that the certain event ends; and
   performing the periodic transmission on the UL using the SPS resource to the BS
   upon the detection that the certain event ends.

* * * * *